March 17, 1970 C. BRAGG 3,500,974
ELECTRIC CLUTCHES AND BRAKE
Filed April 29, 1968 3 Sheets-Sheet 3

United States Patent Office 3,500,974
Patented Mar. 17, 1970

3,500,974
ELECTRIC CLUTCHES AND BRAKE
Cecil Bragg, Kidsgrove, Stoke-on-Trent, England, assignor to English Electric Computers Limited, London, England, a British company
Filed Apr. 29, 1968, Ser. No. 724,908
Claims priority, application Great Britain, May 2, 1967, 20,183/67
Int. Cl. F16d *11/06, 13/22, 67/02*
U.S. Cl. 192—18                              19 Claims

ABSTRACT OF THE DISCLOSURE

This invention relates to shaft driving mechanisms for use in for example high-speed line printers. Two clutches have flywheels journalled on annular bodies coaxially with an output shaft. Friction surfaces, carried by the flywheels cooperate with armatures keyed to the output shaft under the influence of clutch coils, disposed in slots in the annular bodies, to couple the output shaft to one or other of the flywheels. Belt drives rotate the flywheels at different speeds. A brake body carries a coil and a further friction surface, the coil being energizable to cause a further armature keyed to the output shaft to be gripped by the further friction surface to brake the shaft. A clocking disc and/or a control tape associated with the shaft may be used to control the energization of the clutch and brake coils.

---

This invention relates to shaft driving mechanisms.

In some mechanisms it is desired to intermittently advance the angular position of an output shaft in very small increments of time, the output shaft being required to remain stationary between successive advances. Furthermore, it may be desired to be able to select at will the rate of advance of the shaft, a high rate being chosen where the angle to be traversed in one step is large, and a low rate being chosen where only a small angle is to be traversed in one step.

Such a mechanism is required in a so-called high-speed line printer which is used as an output device for printing the output data from an electronic digital computer.

In a mechanism as aforesaid, when the output shaft is relatively slender and drives two or more driven devices which are widely spaced along the output shaft, the driven devices do not move in true synchronism due to the torsional deflection occurring in the output shaft under high rates of angular acceleration and deceleration used in such intermittent drives.

Such torsional deflection will vary as between the conditions of high and low rates of advance, and in present day mechanisms where the two rates of advance are provided by separate driving means disposed at opposite ends of the output shaft the relative displacements of the driven devices can give rise to undesirable effects; for example in a line printer, as mentioned above, the paper being driven at its edges by such devices will skew in opposite directions and by different amounts according to whether the paper is being advanced at a slow advance rate (line by line) or at a high advance rate (by groups of lines).

The present invention seeks to provide a shaft driving mechanism in which an output shaft may be selectively advanced at high or low advance rates by one, compact, mechanism disposed at one end only of the output shaft.

According to a feature of the invention a shaft driving mechanism having an output shaft and an electromagnetic clutch includes a flywheel coaxially mounted with the output shaft and through which the output shaft extends, the flywheel constituting an input member of the clutch, and controllable cooperating friction surface means carried on the flywheel and the output shaft respectively for coupling the flywheel and the output shaft together for rotation when desired.

According to another feature of the invention the shaft driving mechanism includes a frame having bearing means in which the output shaft is journalled, and a frame member disposed adjacent the flywheel and carrying flywheel bearing means supporting the flywheel internally for rotation relative to the frame and wherein the respective friction surface means cooperate together at positions radially inwards of the flywheel bearing means, and electric coil means (constituting an electric energisation means of the clutch) disposed radially inmards of flywheel bearing means are effective to vary the engagement of one friction surface means with the other whereby to couple or uncouple the output shaft from the flywheel as desired.

According to a preferred feature of the invention the frame member of the shaft driving mechanism includes, for supporting the flywheel bearing means, a ferromagnetic annular member carrying in a slot therein an electromagnetic coil disposed concentrically with the output shaft, the slot having a mouth opening towards the friction surface means, and the friction surface means including ferro-magnetic portions which together with the annular member provides a low reluctance magnetic path for magneitc flux produced by the coil when energised.

Preferably the friction surface means associated with the flywheel is rigidly secured to the flywheel so that the said ferromagnetic portions rotate with the flywheel in fixed axial relationship relative to the annular member, and wherein the cooperating friction surface means associated with the output shaft is free to move axially along the output shaft towards the friction surface means associated with the flywheel under the influence of the magnetic flux provided by the said coil.

Preferably the ferro-magnetic parts of the friction surface means associated with the flywheel include two coaxial ferro-magnetic cylindrical portions which project into the mouth of the slot in the annular member, the said cylindrical portions being separated by non-magnetic material.

According to another feature of the invention the output shaft of the shaft driving mechanism extends through the frame member and cooperates on the side thereof remote from the clutch with a second electromagnetic clutch carried by the frame and comprising a flywheel (referred to hereafter as the second flywheel) constituting an input member of this second clutch and disposed co-axially with the output shaft, the latter extending through the second flywheel, and controllable cooperating friction surface means (referred to hereafter as the second friction surface means) carried on the second flywheel and the output shaft respectively for coupling the second flywheel with the output shaft for rotation together when desired, the output shaft being selectively coupled with one or the other flywheels by energising one or the other clutch.

Preferably the frame member carries on the said remote side, flywheel bearing means (referred to hereafter as the second flywheel bearing means) supporting internally the second flywheel for rotation relative to the frame, and wherein the second friction surface means cooperate together at positions disposed radially inwards of the second flywheel bearing means; and electric coil means (constituting an electric energisation means of the second clutch) disposed radially of the second flywheel bearing means are effective to vary the engagement of one of the second friction surface means with the other whereby to couple and uncouple the output shaft from the second flywheel as desired.

Preferably the frame member includes, for supporting the second flywheel bearing means, a ferro-magnetic annular member (hereafter referred to as the second ferromagnetic annular member) carrying in a slot formed therein an electric coil disposed concentrically with the output shaft, this slot having a mouth opening towards the second friction surface means, and the second friction surface means including ferro-magnetic portions which together with the second annular member provide a low reluctance magnetic path for magnetic flux produced by the associated electric coil.

Preferably the friction surface means associated with the second flywheel is rigidly secured to that flywheel so that the said second ferro-magnetic portions rotate with the second flywheel in fixed axial relationship relative to the second annular member, and wherein the second cooperating friction surface means associated with the output shaft is free to move axially along the output shaft towards the friction surface means associated with the second flywheel under the influence of the magnetic flux provided by the said second electric coil.

Preferably the ferro-magnetic parts of the friction surface means associated with the second flywheel member include two coaxial ferro-magnetic cylindrical portions which project into the mouth of the slot in the second annular member, the said second cylindrical portions being separated by non-magnetic material.

According to another feature of the invention the shaft driving mechanism includes a brake which comprises cooperating friction surface means carried on the output shaft and the frame for coupling the output shaft and the same together so as to brake the output shaft, and electric coil means carried by the frame effective to vary the engagement of one friction surface means with the other thereby to couple and uncouple the output shaft and the frame as desired.

Preferably the frame includes an annular part whose angular position relative to the frame is adjustable, the annular part carrying the friction surface means associated with the frame whereby to enable the position at which the output shaft is to be braked to be adjustable.

Preferably the ferro-magnetic annular portion carries in a slot therein an electric coil disposed coaxially with the output shaft, the mouth of the slot carrying friction surface means associated with the frame such that the cooperating friction surface means cooperate together adjacent to the mouth of the slot.

A shaft driving mechanism according to the invention incorporated in a line printer for use with data processing equipment will now be described, by way of example, with reference to the accompanying drawings in which.

Figure 1:
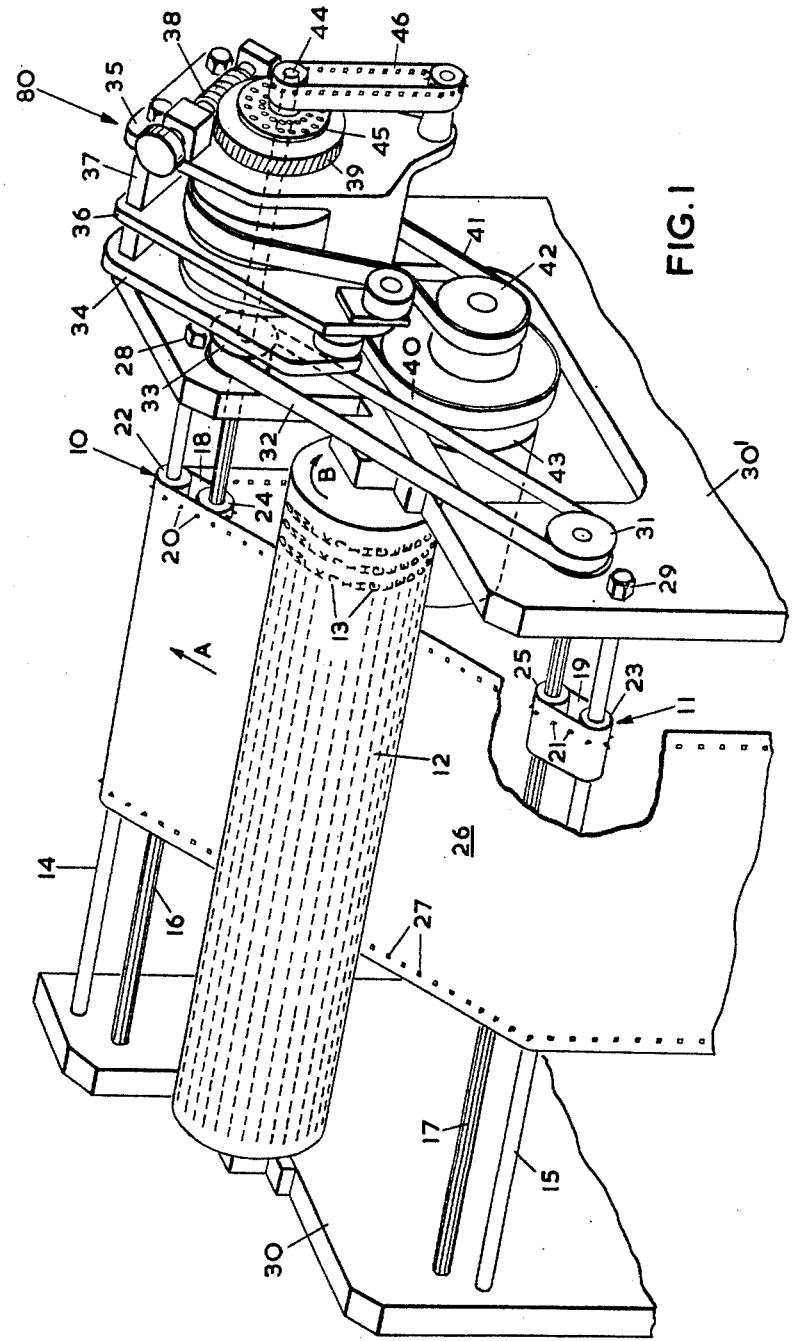
FIG. 1 shows in diagrammatic form a perspective view of the relevant parts of a line printer incorporating the twin speed clutch and brake mechanism.

Referring now to FIG. 1, a character shaft 12 rotates in a direction shown by arrow B, and carries circumferentially spaced lines of character types 13. The character shaft is bearing mounted in the sides 30 and 30' of the line printer and driven at constant speed. A web of paper 26 passes in a direction shown by the arrow A over a fixed platform (not shown) disposed beneath the character shaft. A printing ribbon (not shown) is disposed between the character shaft and the web. A slot extends across the fixed platform, parallel to the axis of the character shaft, so that printing hammers (not shown) placed on the opposite side of the platform to the web may pass through the slot and press the web and printing ribbon against the character types 13 causing an impression of the character types to be printed on the web.

The paper web is driven by four tractor assemblies of which only two, 10 and 11, are visible. The construction of the tractor assemblies is simplified in this description as the details are not relevant to an understanding of the invention. The assemblies 10 and 11 include bands 18 and 19 respectively which have teeth 20 and 21 respectively on their outer surfaces, spaced to coincide with sprocket slots 27 on the web. The bands are carried on wheels 22 to 25. The wheels 22 and 23 are bearing mounted on fixed tractor shafts 14 and 15 which are firmly attached to the sides 30, 30' of the line printer. The wheels 24 and 25 are splined to tractor shafts 16 and 17. The tractor shaft 16 is directly driven from an output shaft 44 of a shaft driving mechanism 80 through a pulley 33 splined to and connecting both shafts, the tractor shaft 17 is driven from output shaft 44 via a belt 32 and pulleys 31 and 33.

A motor 43 which in use is rotated at constant speed, is mounted on the side 30' of the line printer and coupled to a two step stepped pulley wheel 42, two belts 40 and 41 being taken to the shaft driving mechanism.

In operation, the paper web is advanced in steps by the tractor assemblies in the direction of the arrow A. During printing, with the web stationary and the drum revolving continuously, at a given instant a line of particular character types faces the operating ends of the printing hammers so that selected hammers may be operated to print impressions of particular character types in line on the web of paper. When the character drum has rotated so as to present the next line of character types, selected other hammers may be operated to print impressions of these further character types on the paper. This process is continued until a complete line of characters has been printed on the web of paper. The paper web is then stepped on by the tractor assemblies and the printing process repeated to print the next line of alphanumeric characters.

It is found advantageous at times to be able to drive the web of paper at more than one speed, for example, when advancing between separate panels on a fan fold paper web or when printing at a line spacing greater than normal; the shaft driving mechanism enables the web of paper to be driven at two speeds and will now be described with reference to FIGS. 2 and 3.

Figure 2:
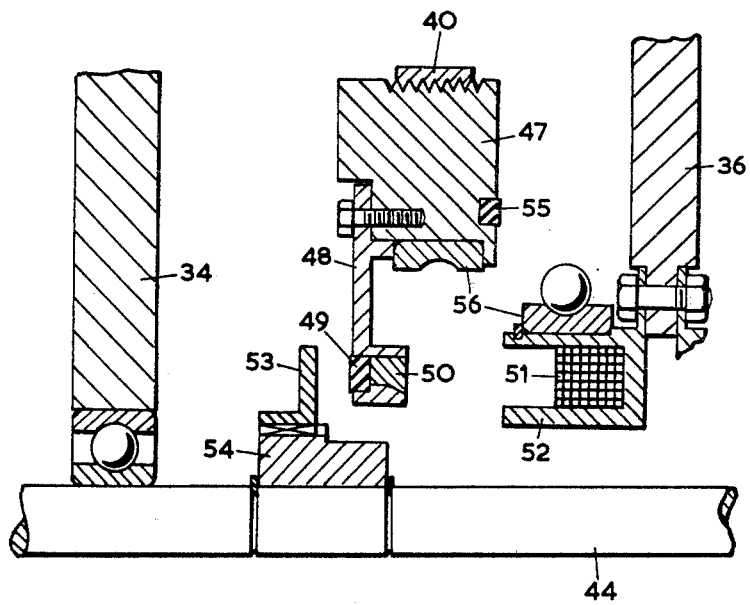
FIG. 2 shows in exploded form a section of the shaft driving mechanism including those parts of a clutch disposed to one side of the output shaft.

For simplicity's sake FIG. 2 shows only those parts constituting one clutch of the shaft driving mechanism. This clutch includes a flywheel of two parts, a main body 47 and a clutch rotor 48, mounted by means of a bearing 56 on a clutch body 52. The main body 47 is driven by the belt 40. The clutch rotor 48 has set in it a non-magnetic plug 50 and a non-magnetic high friction surface 49. The clutch-body 52 contains a clutch coil 51 and is bolted to a mounting plate 36. A radial slot or slots not shown are cut in the clutch body 52, to reduce the flow of eddy currents in it, such currents if allowed to flow would reduce the efficiency of the clutch coil 51 the action of which is to be described below. Fixed to the output shaft 44 is a hub 54 having keyed to it an armature plate 53, the armature plate being free to move axially on the output shaft. Also shown is part of a side plate 34 of the shaft driving mechanism. The output shaft is bearing mounted in and passes through the side plate 34 of the mechanism.

In operation, when it is desired to rotate the output shaft 44 current is passed through the coil 51, setting up a magnetic field in the clutch body 52 which attracts the armature plate towards the clutch body until it contacts and is gripped by the high friction surface 49 in the clutch rotor 48. The armature plate 53 therefore revolves with the flywheel and drives the output at the same speed.

Figure 3:
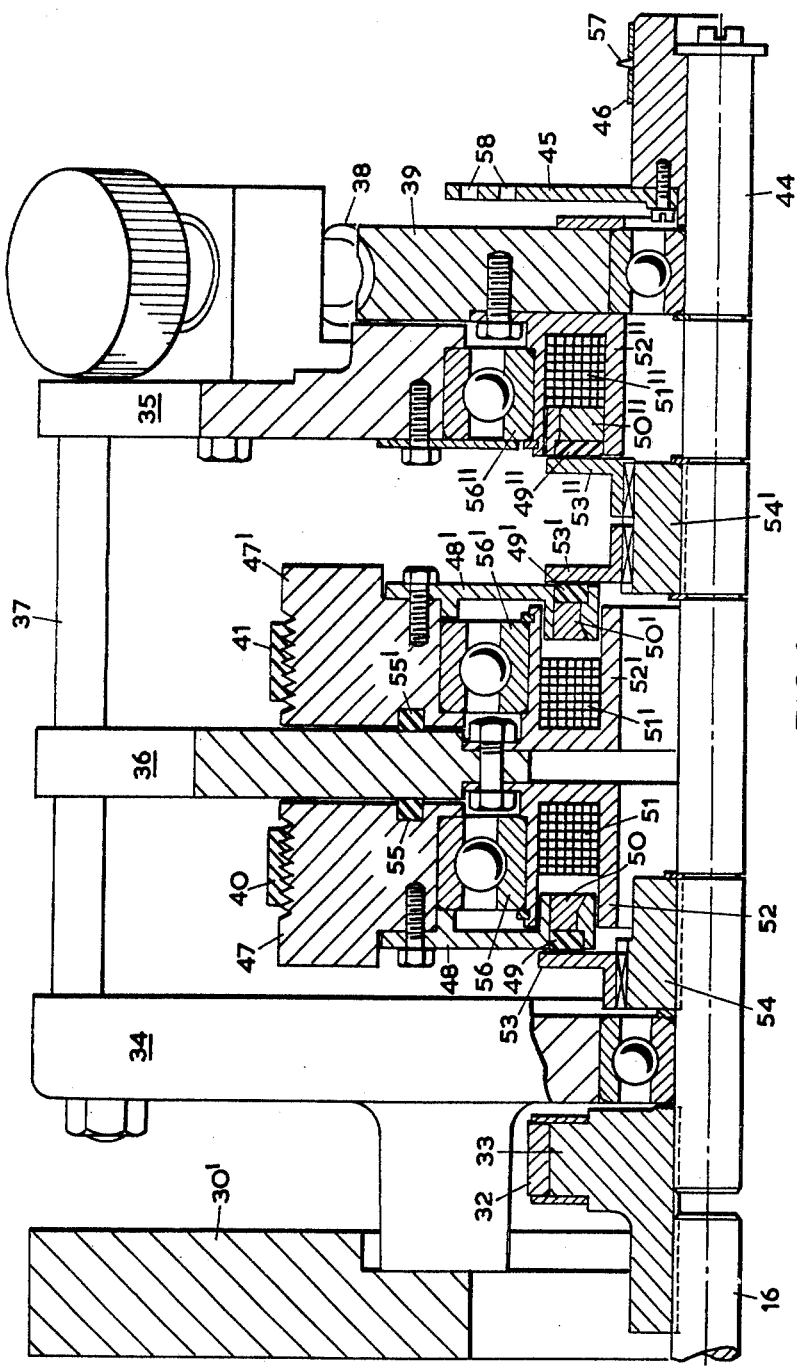
FIG. 3 shows in section those parts of the shaft driving mechanism disposed to one side of the output shaft.

FIG. 3 illustrates the complete shaft driving mechanism. This includes two clutches mounted back to back on the mounting plate 36, the output shaft being common to the two clutches. One clutch is that shown exploded in FIG. 2, and the other clutch is similar, corresponding parts of the two clutches given corresponding reference numerals and the parts of the second clutch being distinguished by being singly primed. Also shown in FIG. 3 is a brake member, the construction of which is in part similar to that of the clutches. The brake member comprises a brake coil 51" set in a brake body 52" one end of which is covered by a non-magnetic plug 50" and high friction surface 49". A brake armature plate 53" is keyed to the hub 54'. The brake body is bearing mounted in a side plate 35 of the twin speed clutch and brake mechanism. The brake body is fixed to an adjustment wheel 39 which provides a bearing mounting for the output shaft 44, and which may be rotated for adjustment purposes by means of a worm screw 38.

A position indicating disc 45 having two rings of holes 58, and a sprocket wheel 57 carrying a tape 46, are fixed to one end of the output shaft 44 near to the adjustment wheel 39. The other end of the output shaft 44 passes through the side plate 34 of the mechanism, the two side plates 34 and 35 being spaced from the mounting plate by spacers 37.

In operation the flywheel main bodies 47 and 47' are driven at constant different speeds by the belts 40 and 41 respectively, the flywheel main body 47 revolving more quickly than the flywheel main body 47'. When it is desired to rotate the output shaft at slow speed the coil 51' is energised. As described above, this causes the output shaft to be rotated so moving the web in the forward direction. When the web has moved a predetermined distance and it is desired to print on it, the clutch coil is de-energised and the brake coil 51" energised setting up in the brake body 52" a magnetic field which attracts the brake armature plate 53" towards the high friction surface 49" which grips it. As this surface is stationary the output shaft 44 is braked. When the printing of a line is complete and it is desired to step the paper forward, the coil 51" is de-energised and the coil 51' again energised causing the output shaft to rotate, so moving the paper web on. If it is required to move the web more quickly, the coil 51 is energised instead of the coil 51' and since the clutch rotor 48 rotates faster than the clutch rotor 48' the output shaft 44 and hence the web 26 is driven more quickly.

Preferably as high initial acceleration may damage the paper web, it is accelerated to high speed in successive stages. The low speed clutch coil 51' is first energised to accelerate the paper web to the low speed. As soon as the low speed is attained by the paper web clutch coil 51' is de-energised and clutch coil 51 is energised simultaneously so that the paper web is further accelerated to the high speed. The paper web is slowed in readiness for printing of a further line by de-energising clutch coil 51 while energising clutch coil 51' to bring the speed of the paper web to the low speed. When this low speed has been reached clutch coil 51' and brake coil 51" are de-energised and energised respectively to bring the paper web to a halt.

The position indicating disc 45, tape loop 46 and other associated equipment select which of the clutch coils 51 and 51' and brake coil 51" is to be energised.

A photo-electric control device is attached to the brake block 39 and arranged such that light shines through the holes in the position indicating disc on to photo-electric cells positioned on the opposite side of the disc. When the light reaching the photo-cells reaches a predetermined intensity the web of paper is brought to a halt to allow the printing of a line to take place. When the printing of the line is complete, coil 51" is de-energised and coil 51 is energised so that the web moves forward again.

Positions of lines of print of the web may be altered with reference to the sprocket holes in the web by adjusting the setting of the worm screw 38. A slight rotation of the adjustment wheel 39 will alter the stop position of the output shaft, and thus the stop position of the teeth 20 and 21 which are coincident with the slots 27 in the web of paper. Thus the position of further printed lines on the web can be altered. The tape loop 46 controls the selection of the high speed clutch coil 51; if it is desired to leave a space of several lines at predetermined repeated intervals, the tape, which may be a paper tape, is punched to carry such information.

It will be seen that a plurality of clutches may be included in a shaft driving mechanism thus allowing the output shaft to be driven at any one of a plurality of different speeds; alternatively two or more of the plurality of clutch flywheels may be driven at the same angular speed and if desired the output shaft may be simultaneously connected to some or all of them; if used in this fashion the mechanism allows a higher starting torque than would be possible, for a given inertia, with a single clutch connection.

I claim:

1. A shaft driving mechanism having an output shaft; a frame; bearing means carried by said frame, the output shaft being journalled in said bearing means; a frame member; and an electromagnetic clutch including, a flywheel disposed adjacent said frame member, said flywheel constituting an input member of the clutch, the output shaft passing concentrically through said flywheel; flywheel bearing means carried by said frame member, the flywheel being supported internally by said flywheel bearing means for rotation realtive to said frame; means for imparting an input drive to said flywheel; controllable co-operating friction surface means carried on said flywheel and said output shaft respectively, the controllable co-operating friction surface means respectively being disposed radially inwards of said flywheel bearing means, at least that friction surface means carried by said output shaft including ferro-magnetic material; and an energising coil carried by said frame member and positioned radially inwards of said flywheel bearing means, the engagement of one friction surface means with the other bearing varied in dependence upon a magnetic field produced by electrical energization of said energizing coil to control the effective coupling of the output shaft to the flywheel.

2. A shaft driving mechanism according to claim 1, wherein the frame member includes, for supporting the flywheel bearing means, a ferro-magnetic annular member carrying in a slot therein an electro-magnetic coil disposed concentrically with the output shaft, the slot having a mouth opening towards the friction surface means, and the friction surface means including ferromagnetic portions which together with the annular member provide a low reluctance magnetic path for magnetic flux produced by the coil when energised.

3. A shaft driving mechanism according to claim 2, wherein the friction surface means associated with the flywheel is rigidly secured to the flywheel so that the said ferro-magnetic portions rotate with the flywheel in fixed axial relationship relative to the annular member, and wherein the cooperating friction surface means associated with the output shaft is free to move axially along the output shaft towards the friction surface means associated with the flywheel under the influence of the magnetic flux provided by the said coil.

4. A shaft driving mechanism according to claim 3, wherein the ferro-magnetic parts of the friction surface means associated with the flywheel include two coaxial ferro-magnetic cylindrical portions which project into the mouth of the slot in the annular member, the said cylindrical portions being separated by non-magnetic material.

5. A shaft driving mechanism as claimed in claim 4, wherein the output shaft extends through the frame member and cooperates on the side thereof remote from the clutch with a second electro-magnetic clutch carried by the frame and comprising; a flywheel (referred to hereafter as the second flywheel) constituting an input member of this second clutch and disposed coaxially with output shaft, the latter extending through the second wheel, and controllable cooperating friction surface means (referred to hereafter as the second friction surface means) carried on the second flywheel and the output shaft respectively for coupling the second flywheel with the output shaft for rotation together when desired, output shaft being selectively coupled with one or the other flywheel by energising one or the other clutch.

6. A shaft driving mechanism as claimed in claim 5, wherein the frame member carries on the said remote side, flywheel bearing means (referred to hereafter as the second flywheel bearing means) supporting internally the second flywheel for rotation relative to the frame; and wherein the second friction surface means cooperate together at positions disposed radially inwards of the second flywheel bearing means; and electric coil means (constituting an electric energisation means of the second clutch) disposed radially of the second flywheel bearing means are effective to vary the engagement of one of the second friction surface means with the other whereby to couple and uncouple the output shaft from the second wheel as desired.

7. A shaft driving mechanism as claimed in claim 6, wherein the frame member includes, for supporting the second flywheel bearing means, a ferro-magnetic annular member (hereafter referred to as the second ferro-magnetic annular member) carrying in a slot formed therein an electric coil disposed concentrically with the output shaft, this slot having a mouth opening towards the second friction surface means; and the second friction surface means including, ferro-magnetic portions which together with the second annular member provide a low reluctance magnetic path for magnetic flux produced by the associated electric coil.

8. A shaft driving mechanism according to claim 7, wherein the friction surface means associated with the second flywheel is rigidly secured to that flywheel so that the said second ferro-magnetic portions rotate with the second flywheel in fixed axial relationship relative to the second annular member, and wherein the second cooperating friction surface means associated with the output shaft is free to move axially along the output shaft towards the friction surface means associated wtih the second flywheel under the influence of the magnetic flux provided by the said second electric coil.

9. A shaft driving mechanism according to claim 8, wherein the ferro-magnetic parts of the friction surface means associated with the second flywheel member include two coaxial ferro-magnetic cylindrical portions which project into the mouth of the slot in the second annular member, the said second cylindrical portions being separated by non-magnetic material.

10. A shaft driving mechanism according to claim 9, including a brake comprising; cooperating friction surface means carried on the output shaft and the frame for coupling the output shaft and the frame together so as to brake the output shaft and electric coil means carried by the frame effective to vary the engagement of one friction surface means with the other whereby to couple and uncouple the output shaft and the frame as desired.

11. A shaft driving mechanism according to claim 10, wherein the frame includes an annular part whose angular position relative to the frame is adjustable the annular part carrying the friction surface means associated with the frame whereby to enable the position at which the output shaft is to be braked to be adjustable.

12. A shaft driving mechanism according to claim 11, wherein the ferro-magnetic annular portion carries in a slot therein an electric coil disposed coaxially with the output shaft, the mouth of the slot carrying friction surface means associated with the frame such that the cooperating friction surface means cooperate together adjacent the mouth of the slot.

13. A shaft driving mechanism according to claim 1 wherein the output shaft extends through the frame member and co-operates on the side thereof remote from said electromagnetic clutch with a second electromagnetic clutch, the second electromagnetic clutch including a second flywheel disposed adjacent said remote side of said frame member, said second flywheel constituting an input member of said second clutch, the output shaft passing concentrically through said flywheel; second flywheel bearing means carried by said frame member, the second flywheel being supported internally by said flywheel bearing means for rotation relative to said frame; means for imparting a second input drive to said second flywheel; second controllable co-operating friction sequence means carried on said second flywheel and said output shaft respectively, the second controllable friction surface means respectively being disposed radially inwards of said second flywheel bearing means, at least that one of second friction surface means carried by said output shaft including ferro-magnetic material; a second energizing coil carried by said frame member and positioned radially inwards of said second flywheel bearing means, the engagement of one of said second friction surface means with the other being varied in dependence upon a magnetic field produced by electrical energization of said energizing coil, the output shaft being coupled respectively to one of said flywheel and said second flywheel by the selective energization of said energizing coil and said second energizing coil respectively.

14. A shaft driving mechanism according to claim 13, wherein the frame member includes, for supporting the second flywheel bearing means, a ferro-magnetic annular member (hereafter referred to as the second ferro-magnetic annular member) carrying in a slot formed therein an electric coil disposed concentrically with the output shaft, this slot having a mouth opening towards the second friction surface means; and the second friction surface means including, ferro-magnetic portions which together with the second annular member provide a low reluctance magnetic path for magnetic flux produced by the associated electric coil.

15. A shaft driving mechanism according to claim 14, wherein the friction surface means associated with the second flywheel is rigidly secured to that flywheel so that the said second ferro-magnetic portions rotate with the second flywheel in fixed axial relationship relative to the second annular member, and wherein the second cooperating friction surface means associated with the output shaft is free to move axially along the output shaft towards the friction surface means associated with the second flywheel under the influence of the magnetic flux provided by the said second electric coil.

16. A shaft driving mechanism according to claim 15, wherein the ferro-magnetic parts of the friction surface means associated with the second flywheel member include two coaxial ferro-magnetic cylindrical portions which project into the mouth of the slot in the second annular member, the said second cylindrical portions being separated by non-magnetic material.

17. A shaft driving mechanism according to claim 13, including a brake comprising: cooperating friction surface means carried on the output shaft and the frame for coupling the output shaft and the frame together so as to brake the output shaft and electric coil means carried by the frame effective to vary the engagement of one friction surface means with the other whereby to couple and uncouple the output shaft and the frame as desired.

18. A shaft driving mechanism according to claim 17, wherein the frame includes an annular part whose angular position relative to the frame is adjustable the annular part carrying the friction surface means associated with the frame whereby to enable the position at which the output shaft is to be braked to be adjustable.

19. A shaft driving mechanism as claimed in claim 18, wherein the ferro-magnetic annular portion carries in a slot therein an electric coil disposed coaxially with the output shaft, the mouth of the slot carrying friction surface means associated with the frame such that the cooperating friction surface means cooperate together adjacent to the mouth of the slot.

References Cited

UNITED STATES PATENTS

| | | |
|---|---|---|
| 721,679 | 3/1903 | Douglas. |
| 3,036,679 | 5/1962 | Millington et al. |
| 3,044,594 | 7/1962 | Bernard. |
| 3,381,784 | 5/1968 | Miller et al. |

BENJAMIN W. WYCHE III, Primary Examiner

U.S. Cl. X.R.

192—48.2, 84, 110, 142, 145